Dec. 23, 1969 R. E. ARSENEAU 3,486,017

DYNAMIC DIVISION ANALOG COMPUTER FOR LOAD ANALYSIS

Filed July 27, 1965 3 Sheets-Sheet 1

Dec. 23, 1969 R. E. ARSENEAU 3,486,017

DYNAMIC DIVISION ANALOG COMPUTER FOR LOAD ANALYSIS

Filed July 27, 1965 3 Sheets-Sheet 3

United States Patent Office 3,486,017
Patented Dec. 23, 1969

3,486,017

DYNAMIC DIVISION ANALOG COMPUTER FOR LOAD ANALYSIS

Roger E. Arseneau, Elk Grove Village, Ill., assignor to Arkorp, Elk Grove Village, Ill., a corporation of Illinois Filed July 27, 1965, Ser. No. 475,169
Int. Cl. G06g 7/00, 7/70
U.S. Cl. 235—193 18 Claims

ABSTRACT OF THE DISCLOSURE

Each of two A.C. input signals have a characteristic which varies as a mathematical function. The signals are mixed and amplified in a common amplifier. One of the amplified signals is filtered out, fed back, and used to control the amplifier responsive to the variations of the mathematical function represented by the filtered signal. The resulting amplifier output is a mathematical division of the dynamic value represented by one of the input signals by the dynamic value of the other input signal. In the described system, one input signal represents the weights in an aircraft, the other signal represents the distances to the centroids of the weights, and the division represents the existing center of gravity.

This invention relates to analog computers and more particularly to dynamic division computers.

When the term "electronic computer" is mentioned, one generally thinks of a very large and expensive office machine. Probably this is because much research and development has been done in the area of large business machines; whereas, the small, low cost computer has tended to be neglected.

There is a pressing need for small pocket-size devices capable of doing some rather complex computations. One such computation calls for mathematical divisions, especially dynamic divisions. The word "dynamic" implies that the computer read out or mathematical answer is supplied continuously and that it varies whenever the input varies. Thus, a read out device, such as a meter, will always give a reading which represents the quotient of a division problem, with the quotient signal changing whenever the input dividend or divisor changes.

There are, of course, many situations where a small computer such as this would fulfill a long felt need. For example, a number of these situations are found in the operation of an aircraft, as where a computer may be used to balance an airplane before take-off. The loading must be distributed throughout the aircraft in a manner such that the plane will glide at a proper angle in case of stall. Otherwise the plane could go out of control. Another computer, such as this, could be used to calculate the length of a runway required for take-off. The load must not exceed the aircraft's capability which varies as a function of certain weather conditions. Obviously, these computers must be very small, lightweight, rugged, and reliable if they are to be carried in an airplane and if human life is to depend upon their performance.

These computers may be used with a wide variety of aircraft types. At one extreme are the small private airplanes flown by part-time pilots who find it inconvenient to make long, time consuming, pre-flight computations. At the other extreme are the very large commercial jet air liners. Any delay in a jet liner take-off caused by pre-flight computations is very expensive for the airline and annoying to the passenger.

Thus, the computer characteristics sought here are: (1) extreme reliability which will prevent jeopardy of human life, (2) lightweight and low power consumption to enable airlifting with no severe load penalty, (3)

rugged construction to allow the computer to be used under a wide latitude of ground conditions without fear or damage, and (4) simplicity of operation to enable foolproof reading by persons having little or no technical training in the operation of electronic equipment. In addition, the computer should afford an analysis of "red line" conditions so that the load or other variable can be adjusted to eliminate fault conditions.

Accordingly, an object of this invention is to provide a new and improved dynamic division computer. A more particular object is to provide a computer for use in conjunction with aircraft operation.

A further object is to provide a load analyzing computer for use in conjunction with a loaded aircraft to ascertain its airworthiness. Here an object is to provide a computer for analyzing the center of gravity of an aircraft as a function of the gross weight of such aircraft. More particularly, an object is to provide a computer which tells the operator of an aircraft how to arrange or rearrange a load to allow the aircraft to become airworthy.

Another object is to provide a low cost, pocket-size computer.

Yet another object is to provide a computer which is extremely reliable.

In keeping with one aspect of this invention, these and other objects are accomplished by providing an adding circuit which works in conjunction with a dynamic dividing circuit. These circuits provide a first signal representative of the sum of a number of first variables. Another signal represents the sum of a number of another variable. The first variable could be the various weights in an airplane, and the second variable could be moment arms between the center of gravity and the points where the weights are located. The second signal is divided by the first signal to give a third signal representative of the moments of the weights. A read out device responds to this third signal to analyze the distribution of weight in the aircraft. This way the first or second signals may be adjusted to tell an aircraft operator how to arrange or rearrange a load to make the aircraft airworthy.

Those skilled in the art will readily recognize that the foregoing are only a few examples of possible uses. The true scope of the invention includes not only these, but also many similar uses. Thus, the invention should not be construed as limiter to the specific structure disclosed herein. On the contrary, it should be construed in its broadest aspect to cover all reasonable equivalents.

An understanding of a preferred embodiment of the invention, together with the equivalents embodying the principles of the invention, may be had by a study of the attached drawings in which:

FIG. 1 schematically represents those parts of an aircraft which illustrate the problems encountered during loading;

Figure 1:
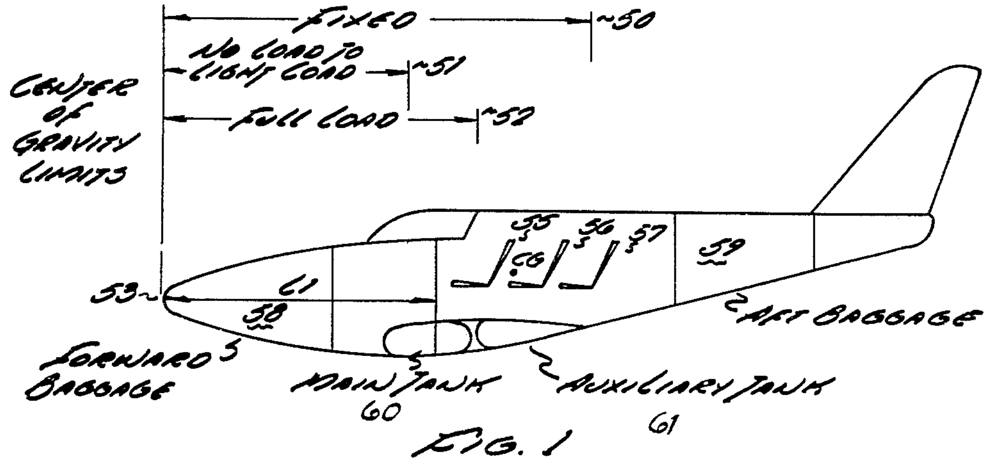

It is necessary to load virtually any aircraft so that its center of gravity falls within certain limits. For example, the center of gravity in the aircraft of FIG. 1 cannot be allowed to locate behind a fixed rear limit 50. If it is and if the aircraft stalls, it will pivot about its center of gravity and fall tail first toward the earth. There would be no way for the pilot to get the airplane nose down and recover speed to pull out of the stall.

Likewise, the allowable center of gravity has a fixed forward limit 51. If the center of gravity goes further forward than this point, the pilot will not be able to keep the nose of the plane up when landing unless an unnecessarily high landing speed is used.

If a logically loaded aircraft carries any load in excess of some fixed weight, the forward limit of the center of gravity moves backward from point 51 toward point 52. If the aircraft is loaded illogically, the center of gravity could be any place; however, this is not concerned with this point. The problem is to hold the center of gravity between the two limits 51–52, 50 which change as a function of variations in loaded weight. Conventionally, an aircraft center of gravity is defined as a distance measured from some datum point 53 on the plane, which may be the extremity of the nose, for example.

Symbolically, the airplane of FIG. 1 is shown as having three rows of seats 55, 56, 57; forward and aft baggage compartments 58, 59, and main and auxiliary fuel tanks 60, 61. Of course, there could also be many other places where weight could be loaded into the plane. The weight may be distributed over all of these locations to adjust the center of gravity of the airplane according to its flight requirements.

The manufacturer will specify where the airplane's center of gravity should lie for any given gross weight load. For example, the curve of FIG. 2 could illustrate one such manufacturer specification. According to this curve, a loaded airplane will remain airworthy if its center of gravity is between 74″ and 87″ from the datum point.

At point A (FIG. 2), the weight of an added load causes the total weight to be more than the weight at point A. Thus, the forward limit of the center of gravity moves toward point B as a function of the increase in weight, as shown.

When the plane reaches its maximum load carrying capacity and it cannot lift any more weight safely, the limits of the center of gravity can vary from 82″ to 87″ ($\overline{BC}$).

In this example, the rear limit C stays fixed as a function of weight but it could also change with the load.

The aircraft is airworthy and capable of flight if the center of gravity lies under the curve A, B, C. If the center is outside the curve, the airplane is said to be "red lined" and it cannot be flown safely. The load in the airplane must then be either rearranged or lightened.

Figure 2:
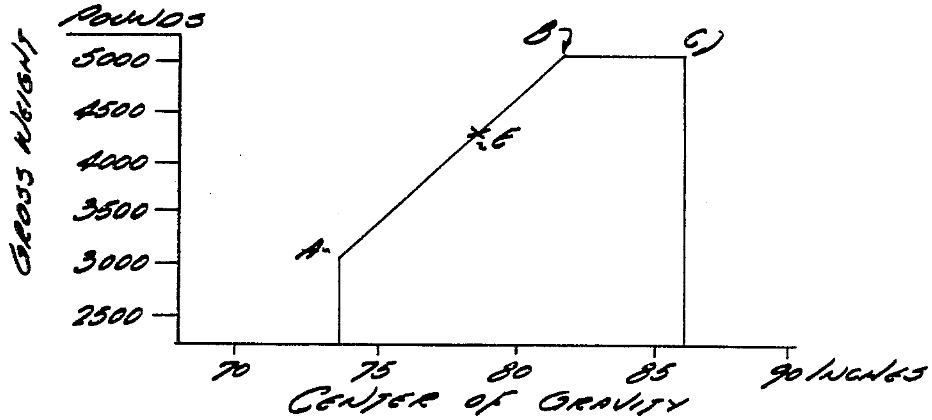
FIG. 2 is a graph which tells how the center of gravity may be allowed to fluctuate as a function of gross weight.
Figure 3:
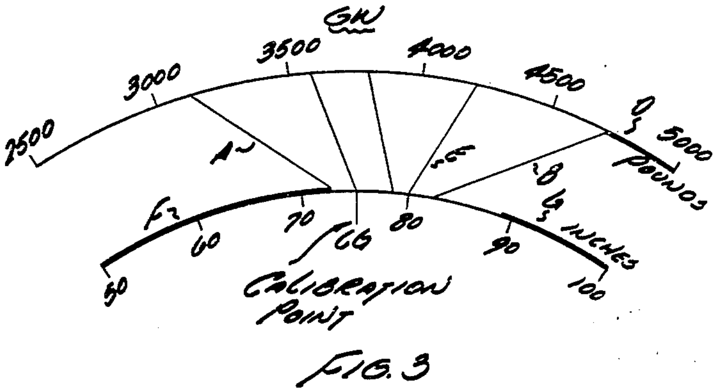
FIG. 3 shows an exemplary read out device which here is the face of a meter dial giving a reading that corresponds to the graph of FIG. 2.

FIG. 3 shows a simple and low cost way of providing a two dimensional read out from a meter. The two dimensions are provided by two scales with lines connecting associated points. One scale represents the vertical axis of FIG. 2 and the other scale represents the horizontal axis. The diagonal lines join the scale points corresponding to the coordinates of points on the graph of FIG. 2. Thus, in FIG. 2 Point A lies at the point 74″, 3200 lbs. Line A in FIG. 3 interconnects points 74″, 3200 lbs. In FIG. 2, point B lies at 83″, 4800 lbs. Line B interconnects points 83″, 4800 lbs. In like manner, each line in FIG. 3 identifies the coordinates of a different point on the curve of FIG. 3. A person using the meter will estimate other points which do not lie on the lines.

To use this meter, a switch is thrown to a gross weight (GW) position. The meter needle is deflected according to data previously stored in the computer. If the needle swings into the red line area D, the plane cannot be allowed to take off because it is carrying more weight than it can safely lift. Assume that the gross weight loaded into the airplane causes a needle deflection to about 4200 lbs. The line E indicates that the center of gravity should not be less than 80″ from the datum point 53.

Next, a switch is thrown to a center of gravity (CG) position, and the computer reads out its computation of the location of the center of gravity with the load stored in the airplane. If the center of gravity is in the red line area F, it is in front of point 51, FIG. 1. If the center of gravity is in the red line area G, it is behind point 50 of FIG. 1. In either of these two red line areas, it is not safe to fly the airplane. On the other hand, with the assumed load of 4200 lbs., the plane can safely take off if the center of gravity is read between the left-hand end of the red line G and 80″.

Upon reflection, it will be obvious that the meter readings (first gross weight (GW) and then center of gravity (CG)) tell the user whether the plane is loaded in a safe manner which puts the center of gravity under the curve A, B, C of FIG. 2.

Figure 4:
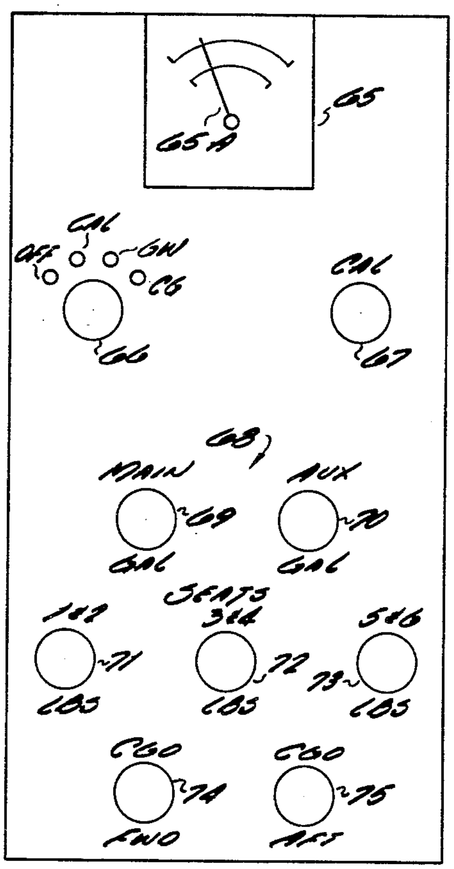
FIG. 4 is a schematic showing of a pocket-size computer constructed according to this invention.

The meter of FIG. 2 appears at 65 in FIG. 4 as a read out device for a pocket size computer. Data is fed into the computer by an operation of a number of knobs which are set by the pilot or other person who loads the plane.

The procedure for using the computer is as follows:

(1) Switch a master select knob 66 from "off" to "CAL" (calibrate). Turn a calibration knob 67 until the needle 65A comes to rest over a calibration point.

(2) Adjust a number of knobs 68 to store data relative to the weight of the various loads in the airplane. Conveniently, these knobs are calibrated in terms of the most useful units of measurement. Thus, knobs 69 and 70 are set to indicate the number of gallons of fuel in the main and auxiliary tanks 60 and 61, respectively. The knobs 71, 72 and 73 are set to the weights of the passengers to be seated in seats 55, 56, 57 (FIG. 1), respectively. Finally, the knobs 74 and 75 are adjusted to indicate the weight of cargo loaded into the forward and aft baggage compartments 58 and 59, respectively.

(3) Turn the master select knob 66 to the GW (gross weight) position. Observe that the needle 65A is giving a reading to the left of the red line D (FIG. 3). Read down the diagonal lines on the face of the meter to determine where the center of gravity should be. For example, if the needle is over line E, the center of gravity should be no less than 80″ from the datum point 53.

(4) Turn the master select knob 66 to the position CG (center of gravity) and observe the reading on the lower meter scale. The airplane can take off if the reading is between the left-hand end of the red line G (FIG. 3) and the CG reading (80″) that was indicated when the switch 66 was in the GW position.

The airplane must be reloaded if, in the CG position, the meter reading is over either of the red lines F or G or is to the left of the CG indicated when the meter is in the GW position. To analyze the reloading problem, it is only necessary to readjust the knobs 68 in a logical manner. For example, the data stored on the knobs 72 and 73 could be reversed to represent a new seating arrangement for the passengers. Or, knobs 74 and 75 could be readjusted to represent a transfer of baggage from the aft to the forward compartment.

If the meter needle 65A gives a desired reading after the knobs 68 are readjusted, the load in the airplane is rearranged in the manner indicated by the new knob settings. If the meter does not give a desired reading despite all knob adjustments, the airplane must be partially unloaded. Again, the adjustment of the knobs 68 will help indicate where an excess load must be removed.

Figure 5:
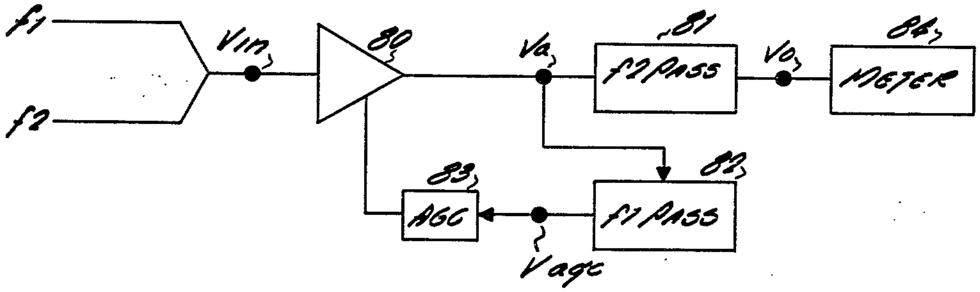
FIG. 5 is a block diagram of an electronic, dynamic division, analog computer.

The electronic parts of the computer are indicated by the block diagram of FIG. 5. These parts include two sources of two separate tones $f_1$ and $f_2$. These could be sharply tuned oscillators. The frequency $f_1$ is used to represent one class of variables, such as the weights loaded into the airplane. The frequency $f_2$ is used to represent another class of variables, such as the moments arms of the load relative to the center of gravity.

Since the center of gravity equals the sum of the moments arms divided by the sum of the weights, it is necessary to divide the signal represented by the frequency $f_2$ by the signal represented by the frequency $f_1$. The resultant signal will be a third signal in the frequency $f_2$, proportional to the distance of the center of gravity from the datum point 53.

As shown by FIG. 5, this computation is accomplished by a division circuit 80 which may be any suitable small-signal, linear amplifier; first and second narrow band pass or band reject filters 81 and 82 tuned to pass frequencies $f_2$ and $f_1$ respectively or reject frequencies $f_1$ and $f_2$ respectively; an automatic gain control (AGC) circuit 83, and an output device, such as a meter 84.

Means are provided for simultaneously amplifying the signals $f_1$, $f_2$. More particularly, the signals applied to the input of the amplifier 80 are the frequencies $f_1$, $f_2$ having amplitudes adjusted by the knobs 68 to represent the sum of the weights and moments, respectively. The output of the amplifier 80 is the frequencies $f_1$ and $f_2$ multiplied by the amplifier gain (G). This is equivalent to the mathematical relation $\Sigma W+\Sigma M$ (the sum of weights plus the sum of the moments).

Means are provided for adjusting the gain of the amplifiers 80 responsive to variations of one of the frequencies. Frequency $f_1$ is applied through the $f_1$ filter 82 and the AGC circuit 83 to adjust the gain of the amplifier 80 by an amount which exactly cancels any variations in the amplitude of the input frequency $f_1$. Stated mathematically, the voltage at the automatic gain control ($V_{agc}$) is a constant (K)— or $V_{agc}=K1=Vf_1\cdot G$. This effectively eliminates any variations in frequency $f_1$ ($\Sigma W$) at the output of amplifier 80.

The adjustment in the amplifier gain also affects the amplitude of the frequency $f_2$ signal as a function of variations in the frequency $f_1$ signal. This means that the amplitude of the frequency $f_2$ signal reaching meter 84 is proportional to the center of gravity of the airplane.

This operation may be restated mathematically in the following manner (for this restatement, reference may be made to FIG. 5 for a disclosure of where the noted voltages appear):

$V_{agc}$=voltage of signal $f_1$ at $V_a$ ($f_1\cdot V_a$)

$f_1V_a$=voltage of $f_1$ at $V_{in}$ multiplied by the amplifier gain G ($f_1V_{in}\cdot G$)

$f_1\cdot V_{in}$=a proportional relationship to the total weight ($\Sigma W$)

$$\Sigma w=K_2Vf_1$$

where $K_2$=a proportional relationship between $\Sigma W$ and $Vf_1$ $$V_0=f_2(V_{in})\cdot G$$

If $\Sigma M$=the total loaded moment of the airplane;

$$\Sigma M=K_3Vf_2$$

where $K_3$=a proportional relationship between $\Sigma W$ and $Vf_2$.

Solving the above equations:

$V_{agc}=V_{in}f_1\cdot G=K_1$ (the gain is adjusted by the automatic gain control to keep $V_{in}f_1G$ constant)

$$V_0=V_{in}f_2G$$

$$G=\frac{K_1}{V_{in}f_1}$$

$$V_0=Vf_2\frac{K_1}{Vf_1}=K_1\frac{Vf_2}{Vf_1}$$

$$Vf_1=\frac{\sum W}{K_2}\quad Vf_2=\frac{\sum M}{K_3}$$

$$V_0=K_1\frac{\frac{\sum M}{K_3}}{\frac{\sum W}{K_2}}=\frac{K_1\cdot K_2}{K_3}\frac{\sum M}{\sum W}$$

This computation proves that the output of the circuit of the block diagram of FIG. 5 is the desired sum of moments divided by the sum of the weights multiplied by a constant. The answer to this division is the desired center of gravity.

Obviously, therefore, the voltage $V_0$ will cause the meter of the circuit 84 to deflect by an amount equal to the center of gravity multiplied by a constant. Hence, it is only necessary to select a meter deflection which compensates for the constant.

From the foregoing analysis, it is apparent that the computer begins with a circuit for generating signals which are proportional to the two classes of variables (weights and moments). These signals are variable over a range extending from zero to the maximum allowable by the aircraft design. For a disclosure of this and other of the computer circuits, reference may be made to FIG. 6.

Figures 6, 7:
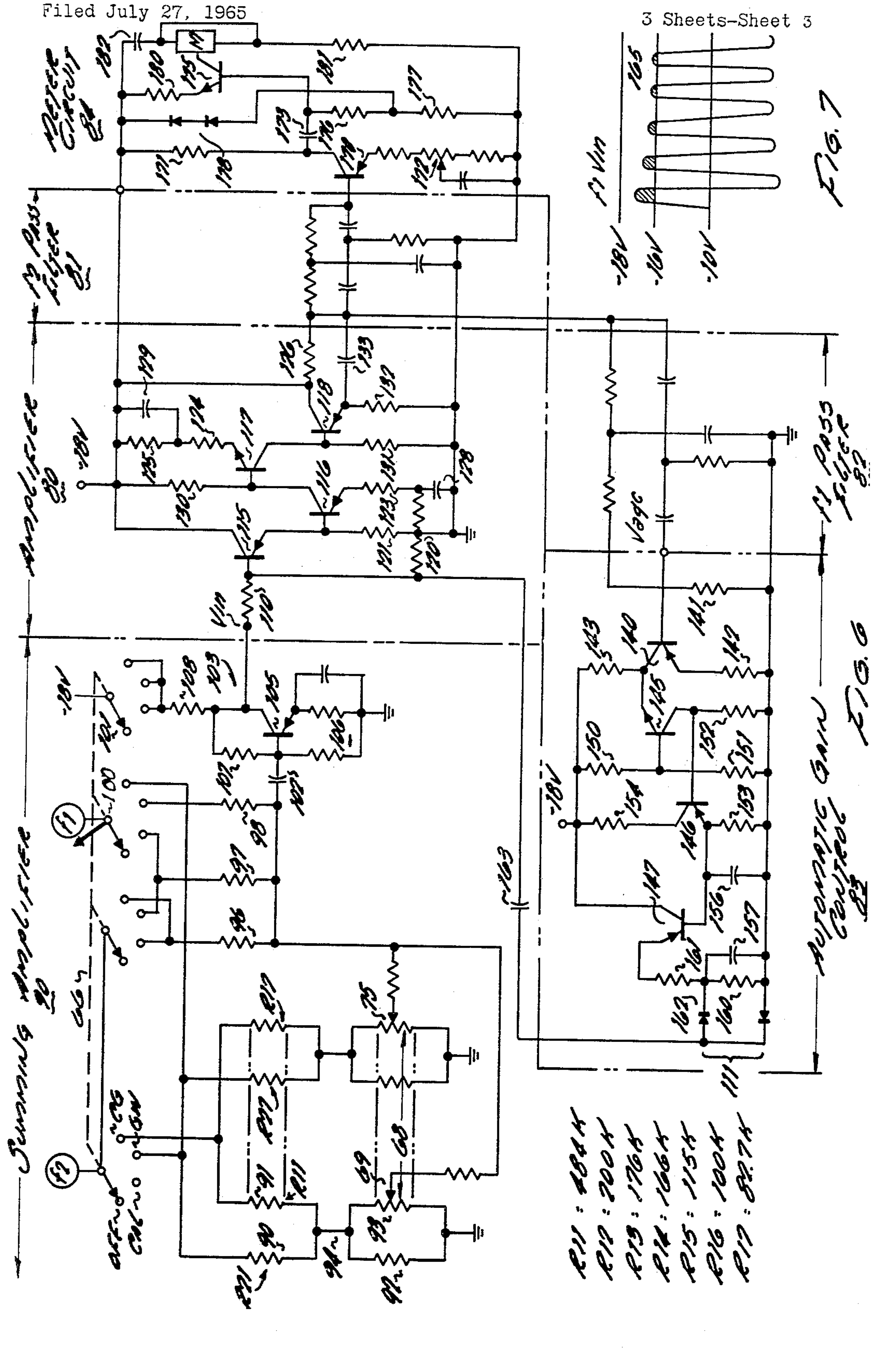
FIG. 6 is a schematic circuit diagram of the computer which tells how to complete the blocks of FIG. 5.
FIG. 7 is a graph of an automatic gain control (AGC) response which adds precision to the computer.

FIG. 6 has been divided, by dot-dashed lines, into the functional circuits disclosed by the block diagram of FIG. 5. An inspection of these and other figures and a comparison of reference characters will disclose the relationship between the fingers.

The summing amplifier 90 includes circuits for producing $V_{in}$ or two signals $f_1$, $f_2$ which vary in amplitude in accordance with two classes of variables. The amplitude is established by the setting of the knobs 68. This drawing shows only the first 69 and last 75 of these knobs which control resistance potentiometers. The remaining knobs (not shown in FIG. 6) control impedance devices, which may be potentiometers. Resistor 90 is chosen to give a voltage at point 94 which represents the maximum weight that may be stored by manipulation of knob 69 as it controls potentiometer 93. Likewise, resistor 91 is chosen to give a voltage at point 94 which represents the maximum moment (i.e. the maximum weight times the distance from the datum point 53 (FIG. 1)) that may be stored by a manipulation of the knob 69.

These potentiometers and their associated resistors form two networks of impedance devices representing two classes of variables. Although resistances are shown, other impedances may be used within the scope of the invention. One network represents the weight variable. It includes the resistors (such as 90, 92 and 93) which are energized by frequency $f_2$ when the master select switch 66 is in its GW position and by the frequency $f_1$ when the switch 66 is in its CG position. The other network represents the moment arms. It includes the resistors (such as 91, 92, and 93) which are energized by frequency $f_2$ when the switch is in the CG position.

Means are provided for varying the impedance of at least some of these devices as a function of some of the variables. More particularly, each knob controls a complex voltage divider. For example, the voltage divider controlled by the knob 69 includes resistors 90–93. The resistor 90 has a value which represents weight; the resistor 91 represents the length of the lever arm extending from a center of gravity to the location of the weight.

In the case of knob 69, for example, the weight is the weight of the fuel in tank 60 (FIG. 1) and the lever arm is L1. At a setting of the potentiometer 93 where the knob 69 has a full travel the voltage at point 94 equals the maximum weight multiplied by the lever arm of a fully loaded main tank 60. From this setting, the knob is rotated to reduce the voltage at point 94 toward the potential of ground. At the other extreme of knob travel, the output potential on the voltage divider 90–93 represents an empty main tank.

In like manner, the setting of knob 75 represents the weight in the aft baggage compartment. The setting of all other knobs (not shown in FIG. 6) represents the weight indicated in FIG. 4.

Upon reflection, it should be apparent that the tone $f_2$ is applied through seven parallel resistors to provide a signal at $V_{in}$ which is proportional to the sum of the moment arms of the airplane load. If the sophistication of the loading problem requires more than a lumped lever arm approximation, the resistor 91 may also be made adjustable.

The resistors 96 and 97 add further increments of $f_1$ and $f_2$ tone signals to take into account the empty moment arm and the weight respectively of the unloaded plane. These resistors may be made to be adjusted if the empty weight of the airplane changes. The resistor 98 provides a constant which selects the scale of the meter deflection.

The tone $f_1$ used for the dividing variable or constant is applied via a two ended knob controlled wiper 100. Thus, when the master selector knob 66 is set to a gross weight reading position, the $f_1$ tone is applied through the meter scale selecting resistor 98, and the tone $f_2$ is applied to the weight representing resistors 97 and 90. This gives a meter reading of the sum of the weight divided by the meter constant. When the selector knob 66 is set to the center of gravity reading position, the $f_1$ tone is applied through the weight representing resistor 97 and the other resistors, such as 90, while the $f_2$ tone is applied through the lever arm representing resistors such as 91 and 96. This way the electrical condition of tone $f_2$ divided by tone $f_1$ is equivalent to the mathematical equation of the sum of the moment arms divided by the sum of the weights.

The switch 101 supplies power when the master select knob is in any position except "off."

The capacitor 102 couples the summing circuit to a low input impedance amplifier 103. The low impedance is desired to provide good summing and avoid a loss of resolution because of circuit loss.

The components of the summing amplifier 103 include a common emitter PNP transistor 105 having a degeneration circuit 106 for biasing its emitter and base. A resistor 107 provides a collector to base feedback which stabilizes the amplifier gain and helps reduce the input resistance. The resistor 108 provides a collector load resistor for the transistor 105.

A resistor 110 provides an input coupling between the summing amplifier 90 and the dividing circuit 80. This resistor forms a voltage divider with a double diode circuit 111.

The dynamic dividing analog circuit includes an amplifier 80, two filters 81 and 82, and an automatic gain control circuit 83. A meter circuit 84 is a direct reading output means.

The components of the amplifier 80 includes four cascaded transistor amplifiers 115–118 which are, respectively, a PNP common collector. The remaining components in amplifier 80 include six biasing resistors 120–126. Capacitors 128 and 129 along with resistors 123 and 124 provide a degenerating feedback for stability. Resistors 130, 131, and 132 form loads for their respective transistors. These transistors are biased to form an extremely stable and linear amplifier.

The capacitor 133 forms an interstage coupling.

The filters 81 and 82 may be any sharply tuned devices. They are here shown as parallel or twin T resistor-capacitor networks of conventional design. The filter 81 passes frequency $f_2$ and rejects the frequency $f_1$. The filter 82 passes frequency $f_1$ and rejects frequency $f_2$.

The automatic gain control circuit 83 includes an AC amplifier 140 using a common emitter PNP transistor configuration. The resistors 141 and 142 provide bias for the base and emitter of the transistor 140. The resistor 143 provides a collector load. The gain of amplifier 140 is set by the ratios of the resistors 142 and 143.

The next three PNP transistors 145, 146 and 147 function as DC electronic switches. The resistors 150 and 151 function as a voltage divider which biases the transistor 145 off, but at a threshold level. Almost any small voltage variation moving above the threshold in the proper polarity direction will be enough to switch it on. The resistor 152 forms a collector load for the transistor 145 and a base bias for the transistor 146. The resistor 153 is connected from ground to emitter of transistor 146 as a bias source. The resistor 154 limits collector current. The capacitors 156 and 157 smooth the A.C. signal of frequency $f_1$ to provide a D.C. bias potential. Also, the capacitor 156 forms a low pass A.C. filter to ground for slowing response time. The emitter of the transistor 147 is coupled to ground via two voltage dividing resistors 160 and 161, connected in series. The resistor 160 furnishes a degenerated bias potential. The resistor 161 limits emitter current and forms a low pass filter with capacitor 157. The divided voltage appearing between resistors 160 and 161 establishes a potential on one side of diode 162 which biases the diodes 162 into conduction.

The two diodes 111 form a dynamic resistance having an A.C. resistance which varies with the D.C. bias current through the diode. A field effect transistor or similar dynamic resistance could also be used. Or a device having a gain which can be changed by a D.C. control voltage or current could be placed in amplifier 80.

The diodes 111 are coupled to the base of the transistor 115 via a coupling capacitor 163.

It may be recalled that the resistor 110 and diodes 111 function as a voltage divider. The resistance of the diodes 111 goes down as the D.C. curernt increases and goes up as the D.C. current through them decreases.

The automatic gain control circuit operates this way. In quiescence, the voltage on the base of the transistor 145 is normally, say, (−) 16 volts (FIG. 7). At this level, the transistor 145 is off.

Suppose that the amplitude of the voltage ($V_{in}$) of the $f_1$ signal increases. The output of the A.C. amplifier transistor 140 increases to make the peak negative voltage on the emitter of the transistor 145 more negative than (−) volts. The transistor 145 switches on and thereby turns on the transistors 146 and 147. Current increases through the diodes 111 as shown by the first shaded loop tip in FIG. 7.

Since more current flows through the diodes 111, the input signal from the summing amplifier divides between the base of the transistor 115 and the diodes 111. This reduces the signal current into the base of the transistor 115 and lowers the gain of the amplifier 80. Responsive to this reduction in gain, the negative potential of the voltage at the emitter of the transistor 145 lowers and reduces the current in the diodes 111 as shown by the second shaded loop tip in FIG. 7. There is a reduction of the signal division applied to the base of the transistor 115.

The process continues until the input signal reaches a stability (as shown at 165 in FIG. 7) which is just above the voltage to which the transistor 145 is biased to turn off.

Upon reflection, it should be apparent that if the amplitude of the signal $f_1$ varies, the gain of the amplifier 80 is adjusted to eliminate the variation. However, the signal $f_2$ also passes through the amplifier 80. Thus, it has its amplitude changed as the gain of the amplifier changes. Since this last change is a function of the change in the amplitude of the signal $f_1$, the output is the signal $f_2/f_1$ multiplied by a constant.

The meter circuit 84 utilizes the output signal passed through the filter 81 to give a meter reading which is directly proportioned to the $f_2$ signal as modified by the automatic gain control.

This meter circuit comprises a PNP transistor 170 in common emitter configuration. The load for this transistor is a resistor 171 coupled between its collector and negative battery. A resistor, capacitor network 172 provides a variable degeneration bias circuit to calibrate the meter circuit gain.

The capacitor 173 forms an interstage coupling.

The meter is driven by an NPN transistor 175 having a meter M coupled as its collector load. Its base or control electrode is connected to the coupling capacitor 173. The base bias is applied through a series of two resistors 176 and 177, the junction of which is connected to negative battery via two diodes 178. This biasing circuit provides a temperature compensation circuit. The resistors 180 provide current for energizing the meter M when the transistor 175 is on. Thus, its value determines the gain of the meter amplifier. The gain of the transistor 175 controls the meter deflection as a function of the signal on its base.

The capacitor 182 and resistor 181 pass transients and slow the meter response time to prevent the meter needle from forcibly striking a pin at the extremity of its deflection when power is turned on.

From the foregoing, it should be apparent that the meter reading is related to the settings of knobs 68 as a function of $f_2/f_1$. The voltages through the two impedance networks in the summing amplifier vary as a function of two variables ($\Sigma M$ and $\Sigma W$). Thus, the division gives a quotient which, in this example, is the center of gravity of the aircraft.

Thus, the following claims are to be construed as broadly as the true scope of the invention.

I claim:

1. An analog computer comprising a plurality of impedance networks, each of said networks including means for representing the dynamic condition of a separate variable, means for energizing each of said networks by a signal having a distinctive characteristic, means responsive to a first of said signals having one distinctive characteristic for controlling a second of said signals having another distinctive characteristic, and means for reading out a mathematical function represented by the second signal as controlled by said first signal.

2. The computer of claim 1 wherein said read out means comprises means for giving a two dimensional read out responsive to a one dimensional reading caused by said controlled second signal.

3. The computer of claim 1 wherein said read out means comprises a meter having one needle and two scales with each of said two scales representing a different one of said variables corresponding to the two scales of a two dimensional graph, and means comprising a plurality of lines joining points on said two meter scales representing the coordinates of preselected points on said two dimensional graphs, whereby the deflection of a needle on said meter gives a reading in terms of the coordinates of points on said graph.

4. The computer of claim 1 wherein said control of said second signal provides, as the mathematical function, a dynamic division of the variables represented by said first and second signals.

5. The computer of claim 4 wherein said first signal is a tone of one frequency applied through a first of said networks representing the sum of certain weights, said second signal is a tone of another frequency applied through a second of said networks representing the sum of the moment arms of said certain weights.

6. The computer of claim 1 and means for varying at least some of said impedances to store data relative to said separate variables, thereby changing at least one significant characteristic of said signals.

7. A dynamic computer comprising an adding circuit for providing at least two output signals, each of said signals representing the summation of a plurality of like variables, means for dividing the summation represented by a first of said signals by the summation represented by the second of said signals, and means responsive to said divided signal for giving a dynamic output reading representing a quotient of the division.

8. The computer of claim 7 wherein said means for giving an output reading comprises means for giving a two-dimensional read out responsive to at least one one-dimensional control signal.

9. The computer of claim 7 wherein said means for giving an output reading comprises a meter having one needle and two scales corresponding to the two scales of a two dimensional graph, and means comprising a plurality of lines joining points on said two meter scales representing the coordinates of preselected points on said two dimensional graph, whereby the deflection of a needle on said meter gives a reading in terms of the coordinates of points on said graph.

10. An aircraft load analyzer for analyzing the existing center of gravity of an aircraft as a function of the existing weight distribution in such aircraft, said analyzer comprising means for storing data relative to the gross weight of a load distributed over said aircraft, means for giving a signal representing the sum of the moments of said distributed load, and means for providing a read out which tells where the existing center of gravity is located under substantially any given load conditions.

11. The analyzer of claim 10 wherein said read out means comprises a meter having one needle and two scales corresponding to the gross weight of said aircraft load and the center of gravity of said aircraft, and means comprising a plurality of lines joining points on said two meter scales representing the coordinates of preselected points on a two dimensional graph having gross weight plotted on one axis and center of gravity plotted on another axis, whereby the deflection of a needle on said meter gives a reading in terms of the coordinates of predetermined point.

12. A computer comprising a meter having two scales corresponding to the two scales of a two dimensional graph, means comprising a plurality of lines joining points on the two meter scales representing the coordinates of preselected points on said two dimensional graphs, whereby the deflection of a needle on said meter gives a reading in terms of the coordinates of predetermined points on said graph, a plurality of adjustable controls for storing data signals representing information read along one scale on said graph, and means responsive to a single signal for causing said meter to read out on each of said two meter scales as a function of said stored data, whereby individual readings may be taken for each of said two dimensions.

13. A computer comprising sources of two different frequencies, means coupled to the output of each of said sources for modifying the amplitude of said frequencies in accordance with a corresponding variable, means for amplifying said modified signals to establish a predetermined gain therein, means coupled to the output of said amplifier for separating said two signals and automatic gain control means for feeding back one of the two signals to control said amplifier for eliminating any change in amplitude in said one signal, whereby the amplitude of said other signal is modified as a function of variations in said one signal.

14. An analog computer comprising means for generating two signals having different frequencies, two networks of impedance devices representing two classes of variables, each of said networks having a plurality of variables, means for varying the impedance of at least some of said devices as a function of the variations of certain of said variables, means for sending one of said frequencies through one of said networks whereby the output of said one frequency varies as a function of the sum of all of the impedances in said one network, means for sending the other of said frequencies through the other of said networks whereby the output of said other frequency varies as a function of the sum of all of the impedances in said other network, amplifier means for simultaneously amplifying both of the output frequencies, and automatic gain control means responsive to the amplifier output of a first of said frequencies for adjusting the gain of said amplifier means whereby the second of said frequencies multiplied by the gain of said amplifier varies as the quotient of the sum of one of said classes of variables divided by the sum of the other of said classes of variables.

15. An analog computer for analyzing the airworthiness of an aircraft comprising means for providing a first signal which varies as a function of the sum of a number of weights loaded into said aircraft, means for providing a second signal which varies as a function of the sum of the moment arms of said weights, means for dividing said second signal by said first signal to provide a third signal which varies as the moments of said weights, and means for giving an output which represents the center of gravity of said aircraft.

16. A computer for analyzing the airworthiness of an aircraft comprising means for storing input signal data relative to a plurality of flight characteristics of said aircraft, means for modifying all of said data signals according to changes in said characteristics, feedback means for eliminating the changes which occur in certain of said data signals, thereby holding constant the data signals relative to said certain data and modifying all signals relative to other of said data, said modification of said other signals occurring as a function of the changes in said certain data, and output means responsive to said other for indicating the airworthiness of said aircraft.

17. A dynamic division analog computer for analyzing the airworthiness of an aircraft comprising means for adding a first plurality of variables, means for adding a second plurality of variables, means comprising a potentiometer per variable for varying both said first and second variables, means for dividing the sum of the first variables by the sum of the second variables, and means for giving a reading of the quotient of said division with said reading varying when said variables vary.

18. An analog computer for dynamically dividing one variable value by another variable value comprising two sources of A.C. signals representing said two values, means for varying said two signals as a function of the respective variations in said two values, means for mixing said signals, means for amplifying said mixed signals, and means coupled to the output of said amplifier for feeding back one of the amplified signals to adjust said amplifier as a function of the variations in one of said signals.

References Cited

UNITED STATES PATENTS

| | | | |
|---|---|---|---|
| 2,540,807 | 2/1951 | Berry | 235—150.2 X |
| 2,541,429 | 2/1951 | Mathes et al. | 235—150.2 X |
| 2,559,718 | 7/1951 | Goodlett et al. | 235—150.2 X |
| 2,987,254 | 6/1961 | Kolisch | 235—150.2 |

EUGENE G. BOTZ, Primary Examiner

J. F. RUGGIERO, Assistant Examiner

U.S. Cl. X.R.

235—150.2, 194